(12) United States Patent
Kjölaas

(10) Patent No.: US 10,701,947 B2
(45) Date of Patent: Jul. 7, 2020

(54) METHOD AND SYSTEM FOR MOVING KILLED FISH IN A PIPE OR PIPELINE

(71) Applicant: Seaside AS, Stranda (NO)

(72) Inventor: Frode Haakon Kjölaas, Stranda (NO)

(73) Assignee: Seaside AS, Stranda (NO)

(*) Notice: Subject to any disclaimer, the term of this patent is extended or adjusted under 35 U.S.C. 154(b) by 0 days.

(21) Appl. No.: 15/771,212

(22) PCT Filed: Oct. 27, 2016

(86) PCT No.: PCT/NO2016/050212
§ 371 (c)(1),
(2) Date: Apr. 26, 2018

(87) PCT Pub. No.: WO2017/074198
PCT Pub. Date: May 4, 2017

(65) Prior Publication Data
US 2018/0310575 A1    Nov. 1, 2018

(30) Foreign Application Priority Data

Oct. 29, 2015 (NO) .................................... 20151469

(51) Int. Cl.
*B65G 51/01* (2006.01)
*A22C 25/08* (2006.01)

(52) U.S. Cl.
CPC .............. *A22C 25/08* (2013.01); *B65G 51/01* (2013.01); *B65G 2201/0202* (2013.01); *B65G 2203/0241* (2013.01)

(58) Field of Classification Search
CPC ........ B65G 51/01; B65G 53/30; B65G 53/66; B65G 53/50; B65G 53/58; B65G 53/60; B65G 2203/0241; A22C 25/08

USPC ........ 406/19, 46, 47, 48, 84, 88, 92, 93, 94, 406/95, 106, 168, 192, 197
See application file for complete search history.

(56) References Cited

U.S. PATENT DOCUMENTS

| | | | | |
|---|---|---|---|---|
| 1,369,302 A * | 2/1921 | Smith | ................... | A22C 25/08 452/108 |
| 1,893,903 A * | 1/1933 | Mullins | ................... | A22C 25/08 193/2 B |
| 2,535,349 A * | 12/1950 | Christiansen | .......... | A22C 25/08 452/108 |
| 3,212,822 A | 10/1965 | Payne et al. | | |
| 3,254,924 A | 6/1966 | Milton et al. | | |
| 3,752,314 A * | 8/1973 | Brown | ..................... | B03B 5/48 209/173 |

(Continued)

FOREIGN PATENT DOCUMENTS

| | | |
|---|---|---|
| NO | 307361 | 3/2000 |
| NO | 310951 | 9/2001 |

(Continued)

OTHER PUBLICATIONS

Search Report and Written Opinion.

*Primary Examiner* — Joseph A Dillon, Jr.
(74) *Attorney, Agent, or Firm* — Alix, Yale & Ristas, LLP

(57) ABSTRACT

A method and system for moving killed fish in a pipe or pipeline, comprising water and supply of pressurized air or water pressure or both to create zones having different properties in the pipe or pipeline to form a controllable water flow for propulsion of and controlled retention time of fish in the pipe or pipeline.

7 Claims, 3 Drawing Sheets

(56) References Cited

U.S. PATENT DOCUMENTS

| | | | | |
|---|---|---|---|---|
| 4,046,996 A * | 9/1977 | Williams | ............... | A01K 97/05 |
| | | | | 377/6 |
| 4,154,484 A * | 5/1979 | Holzenberger | ........ | B65G 53/30 |
| | | | | 406/106 |
| 4,291,435 A * | 9/1981 | Hartmann | .............. | A22C 25/08 |
| | | | | 452/151 |
| 4,293,250 A * | 10/1981 | Hayashi | ................ | B65G 53/30 |
| | | | | 406/109 |
| 4,551,042 A * | 11/1985 | Hagedorn | ............. | B65G 53/30 |
| | | | | 406/153 |
| 4,558,990 A * | 12/1985 | Roach | .................... | F04F 5/466 |
| | | | | 417/54 |
| 4,637,760 A * | 1/1987 | Boos | ..................... | B65G 51/01 |
| | | | | 406/105 |
| 4,700,547 A * | 10/1987 | Hayashi | .................. | A23B 4/08 |
| | | | | 62/65 |
| 4,756,058 A * | 7/1988 | Gollnitz | ................ | G05B 19/23 |
| | | | | 452/151 |
| 4,826,362 A * | 5/1989 | Hayashi | ................ | B65G 53/30 |
| | | | | 406/109 |
| 5,078,579 A | 1/1992 | Ryan | | |
| 8,109,698 B2 * | 2/2012 | De Greef | ............... | B65G 51/01 |
| | | | | 406/106 |
| 9,073,707 B2 * | 7/2015 | Ruissen | ................. | B65G 51/01 |
| 9,717,258 B2 * | 8/2017 | Halse | ..................... | A01K 79/00 |
| 9,758,302 B1 * | 9/2017 | Brazeau | ................ | B65G 1/06 |
| 2009/0142146 A1 * | 6/2009 | Opatril | ................... | B65G 51/01 |
| | | | | 406/10 |
| 2014/0166551 A1 * | 6/2014 | Blanc | ........................ | B03B 5/00 |
| | | | | 209/606 |
| 2015/0016898 A1 * | 1/2015 | Hockett | ............... | B65G 47/684 |
| | | | | 406/108 |
| 2015/0072400 A1 * | 3/2015 | Clarke | .................. | C12M 21/02 |
| | | | | 435/257.1 |
| 2016/0113298 A1 * | 4/2016 | Halse | ..................... | A01K 79/00 |
| | | | | 406/106 |
| 2017/0000094 A1 | 1/2017 | Bartsch | | |
| 2017/0325432 A1 * | 11/2017 | Halse | ..................... | A22C 25/08 |

FOREIGN PATENT DOCUMENTS

NO              315632           10/2003
WO          WO02078436          10/2002

* cited by examiner

METHOD AND SYSTEM FOR MOVING KILLED FISH IN A PIPE OR PIPELINE

BACKGROUND

The disclosure concerns a method of moving killed fish in a pipe or pipeline, and a system for the same.

In particular, the disclosed embodiments concern use of controlled water flow by means of supply of pressurized air and/or water pressure for moving killed fish in a pipe or a pipeline, to provide transport of fish in combination with bleeding and/or cooling. Moreover, the disclosed embodiments concern use of pressurized air and/or water pressure to form air/water partitions which creates zones within the pipe or pipeline having different properties for propulsion of fish there through, controlled distribution of fish in the pipe or pipeline, including controlled retention time and hence controlled bleeding and/or cooling of fish being transported.

NO310951 B1, NO315632 B1 and NO307361 describe that fish, after being throat cut, is forwarded to bleeding in a tank or chamber/container, in which the fish also can be cooled and flushed/washed. In other words, containers or chambers where the fish can get rid of the blood and die after being throat cut.

NO310951 B1 (SOTRA MASKIN & PROSJEKTERING AS) concerns a plant for slaughtering fish. A bleeding chamber is provided with vanes/transport walls which controls the retention time of the fish in the tank.

NO315632 B1 (Svein Olav Fjaera et. al.) concerns a method of handling fish, farmed fish, from delivery to slaughtering and bleeding. The bleeding fish is forwarded in the bleeding chamber with cooled water, by means of carriers on an endless band. It is considered advantageous that the fish is cooled in living state before it is throat cut.

NO307361 B1 (Melbu Tech AS) concerns a cylindrical slaughtering/cooling tank. Its internal part is provided with a gate rotating about a vertical axis, having radially extending walls dividing the tank volume in sectorial chambers. Fish residing in the chambers can be lifted out of the tank by a loose liftable bottom section. The tank can be provided with cooling.

Disadvantages of the prior art include, among other things, that the fish cannot be handled while residing in these tanks/chambers/vessels. In addition, these tanks/chambers/vessels are space demanding and are not flexible with regard to area adaptation. Moreover, these tanks/chambers/vessels have the disadvantage that they are demanding with respect to cleaning, and will in addition exhibit limited capacity.

Moreover, prior art makes use of mechanical carriers, which involves physical affection on the fish, which again can damage fish.

Moreover, complicated lifting devices are often required to take the fish out of these tanks/chambers/vessels again, which increases both cost and maintenance.

It is accordingly a need to provide a method and a system for a more effective and gentle handling of fish than is possible by prior art, which in particular enables transport combined with bleeding and/or cooling.

It is also a need to provide a method and a system which is less space demanding than prior art and which is flexible in view of area adaptation.

It is also a need to provide a method and a system where fish is transported without physical contact with the fish.

SUMMARY

The disclosure provides a method and system which partly or completely solve the problems of the prior art mentioned above.

The disclosure also provides a method and system for moving killed fish in a pipe or pipeline by means of controlled water flow provided by means of supply of pressurized air and/or water pressure to provide transport of fish combined with bleeding and/or cooling.

Also provided is a method and a system for moving killed fish in a pipe or a pipeline by means of controlled water flow provided by means of supply of pressurized air and/or water pressure that provides controllable retention time in the system without the use of mechanical influence.

Also provided is a method and a system of moving killed fish in a pipe or a pipeline by means of controlled water flow provided by means of supply of pressurized air and/or water pressure, where the controlled water flow is utilized to distribute fish in the pipe or the pipeline by creating zones of propulsion having different properties in the pipe or pipeline by means of air/water partitions having different properties.

The system in accordance with the disclosure is based on a pipe or pipeline, said pipe or pipeline substantially extending horizontally, but can in addition comprise sections extending vertically between different horizontal planes, and can comprise sections which changes direction in the horizontal plane or vertical direction, for in this way form the system in accordance with the location in question and available space where the system is to be installed. In this way, e.g. a pipe or pipeline can extend between different floors in a building, or around other installations at an assembly site. Moreover, the pipe or pipeline further comprises an outlet end which is open, and a closed opposite end.

At the end of the pipe or pipeline which is closed, the pipe or pipeline is provided with a supply device for supply of killed fish, e.g. from a slaughtering line, throat cutting device or similar.

Moreover, the system comprises a supply of water or means for receiving water to the pipe or pipeline, typically arranged at suitable locations in longitudinal direction of the pipe or pipeline.

The system further comprises means or a unit for supply of pressurized air and/or water pressure to the pipe or pipeline, said means or unit being arranged at suitable locations in the longitudinal direction of the pipe or pipeline. Pressurized air and/or water pressure can be supplied by means for supply of pressurized air and/or water pressure at desired locations in the pipe or pipeline, said air/water partition creating zones in the pipe or pipeline having different properties, including direction and magnitude of water flow, said zones being used to provide propulsion of fish in the pipe or pipeline, determining direction and magnitude of the water flow in the pipe or pipeline, and in this manner provide controllable water flow in the pipe or pipeline which enables controllable retention time of fish in the pipe or pipeline, including possibilities of distributing the fish in the pipe or pipeline.

In this way the zones (formed between air/water partitions) are used for distributing the fish as much as possible in the longitudinal direction of the pipe or pipeline, and determining the retention time for the fish in the pipe or pipeline and therethrough also bleeding time and/or cooling time of the fish.

An output device is arranged at the outlet end of the pipe or pipeline to extract fish from the pipe or pipeline. Then, the fish can be transferred to a fish receiving device, where fish and water is separated and the water is returned back to the water supply system for reuse.

Moreover, the system is provided with a control unit and sensor means. Typically the sensor means will be arranged to measure or detect one or more of:
- volume or number of fish being supplied to the pipe or pipeline at any time,
- volume or number of fish present in the pipe or pipeline at any time,
- volume or number of fish present in the respective zones in the pipe or pipeline,
- distribution of fish in the pipe or pipeline, including the different zones,
- water level in the pipe or pipeline,
- number of fish extracted through the output device, etc.

Moreover, sensor(s) can be arranged to measure air pressure, water pressure and optionally water supply.

Moreover, the system preferably is provided with overflow means to allow water to exit the pipe or pipeline. As the amount of fish in the pipe or pipeline increases, water present in the pipe or pipeline will be displaced, and hence the water level can then be controlled by the overflow means. The same applies during supply of water pressure, which increases the water volume in the pipe or pipeline.

The control unit can control the system based on information from the sensor(s), with regard to water supply and supply of pressurized air and/or water pressure, controlling the air/water partitions and hence the properties of the different zones in the pipe or pipeline, controlling the output device, and opening and closing for supply and extraction of fish.

Moreover, the control unit can also comprise a mode of washing the pipe or pipeline, where the system also comprises means for washing the pipe or pipeline, e.g. in the form of an integral washing system in the pipe or pipeline.

The system and the method functions in the way that the pipe or pipeline, with the output device and the supply device closed, is filled with water to a desired level. After the pipe or pipeline has been provided with desired water level, fish is supplied by means of the supply device at the closed end of the pipe or pipeline, e.g. individually or batchwise.

Then, pressurized air and/or water pressure is supplied at different supply locations in the longitudinal direction of the pipe or pipeline to create air/water partitions having different properties in longitudinal direction for propulsion of fish in zones of the pipe or pipeline and hence spread fish in the longitudinal direction of the pipe or pipeline. By controlling supply and direction of pressurized air and/or water pressure to form zones having different properties between the air/water partitions, simultaneously controlled propulsion and hence controlled bleeding time and/or cooling of the fish in the pipe or pipeline is obtained. Pressurized air and/or water pressure will then be supplied under the water level in the pipe or pipeline.

As the pipe or pipeline is filled with fish, the overflow means arranged to the pipe or pipeline will make sure that when fish displace water, the water will leave and the water level in the pipe or pipeline is maintained within a predetermined limit. The same also applies when water pressure is being used to control the properties within the respective zones. It will also be an advantage that water supply means supplies water to the pipe or pipeline substantially continuously, to provide a substantially continuous exchange of water in the pipe or pipeline.

When a desired retention time (bleeding time/cooling time) for fish in the pipe or pipeline has been achieved, the output device is activated and fish is being extracted. Advantageously, water and fish are separated and the fish can be transferred further to other units for additional treatment, whereas the water advantageously is recycled back to the water supply system for reuse. In this way, a system is energy efficient and minimizes water consumption.

After a certain period of time of use, a certain amount of foreign substances are accumulated in the pipe or pipeline. Since the system comprises an integral washing system, the pipe or pipeline can be flushed/washed free from foreign substances.

BRIEF DESCRIPTION OF THE DRAWINGS

The disclosed embodiments will be described in further details with reference to the attached drawings, where.

Figure 1A:
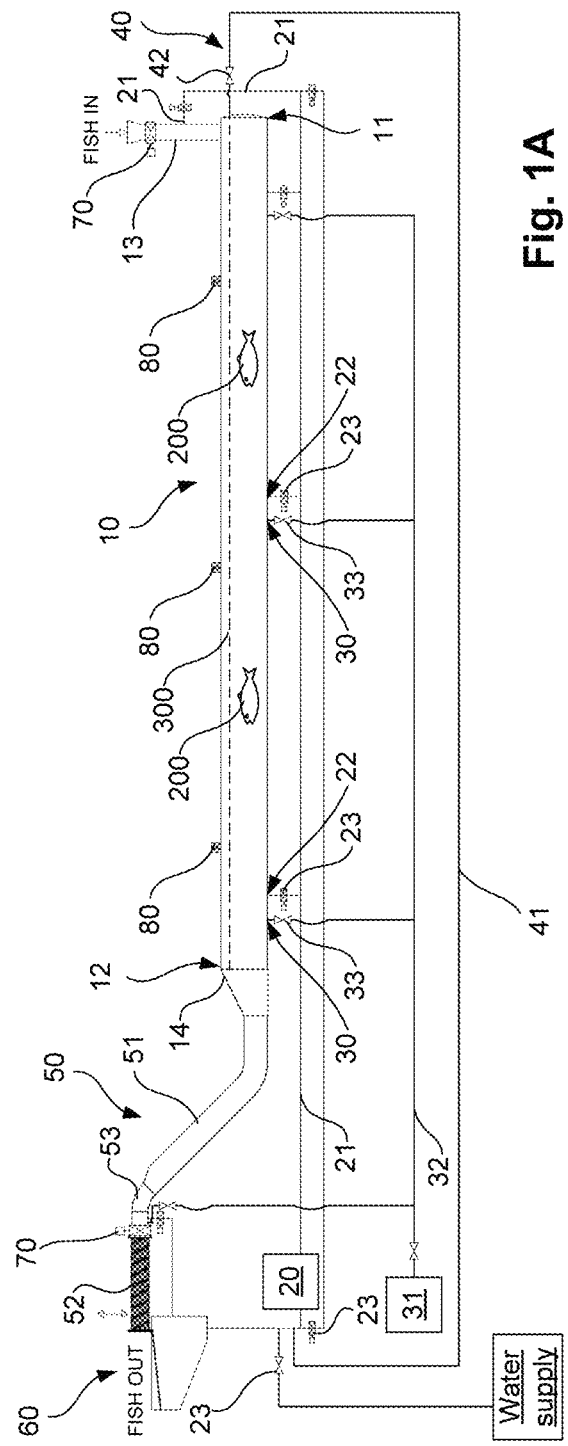
FIG. 1A illustrates a principle drawing of the disclosed system.
Figure 1B:
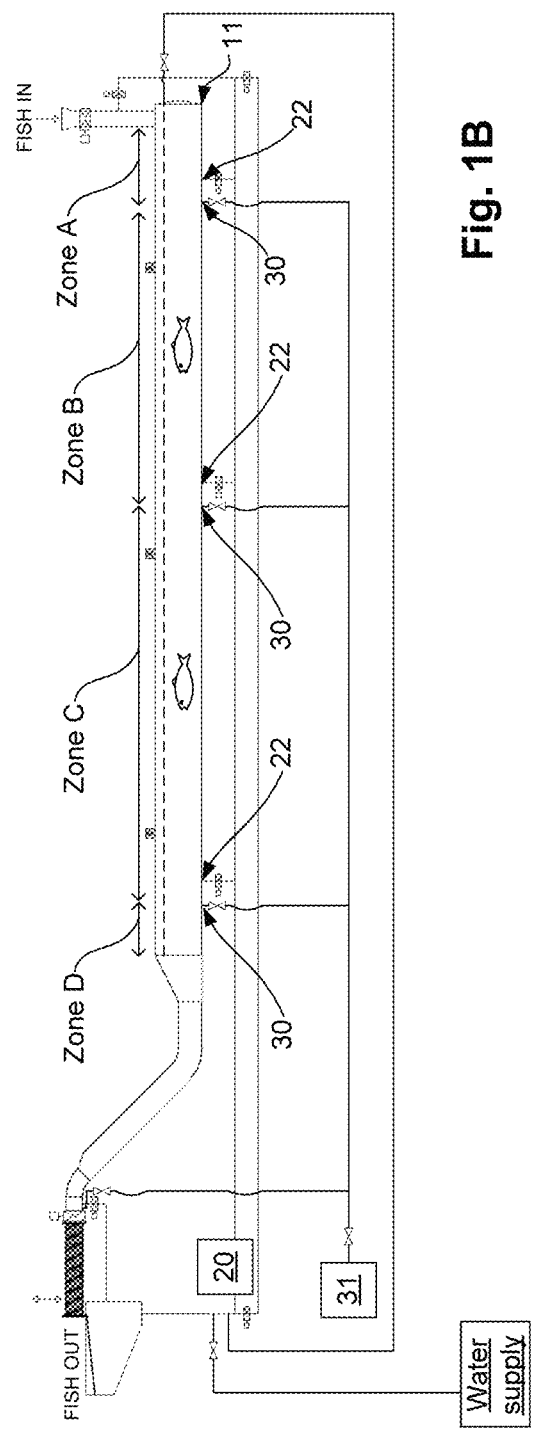
FIG. 1B illustrates a principle drawing of the system shown in FIG. 1A, with defined zones.

Reference is now made to FIGS. 1A and 1B, which illustrate principle drawings of a preferred system in accordance with the disclosure.

The main component of the system is a pipe or a pipeline 10 which is closed in one end 11 and open in the other end 12. The pipe or pipeline 10 is at the closed end 11 provided with a supply device 13 for supply of killed fish 200, e.g. from a system for throat cutting, a slaughtering line or similar, known per se.

Moreover, the system comprises a water supply system in the form of a water pump 20 and piping 21 extending to supply points 22 in the pipe or pipeline 10 for supply of water to the pipe or pipeline 10, wherein the supply points 22 are distributed in longitudinal direction of the pipe or pipeline 10. Controllable valves 23 are arranged at each water supply point 22 to control the water supply at the respective supply point 22.

The disclosed system in further comprises a supply system for pressurized air or water pressure to the pipe or pipeline 10 via supply points 30 arranged in the longitudinal direction of the pipe or pipeline 10. The supply system for pressurized air and/or water pressure comprises, for example, a compressor having a pressure tank or a pump 31, piping 32 which extends from the compressor pressure tank or the water pump 31 to the supply points 30. Moreover, controllable valves 33 are arranged in the pipelines 32 to control the supply of pressurized air and/or water pressure at the respective supply points 30. The supply points 30 for pressurized air or water pressure is in the example illustrated adjacent to the supply points 22 for water, but can nevertheless be arranged at other locations. In some embodiments they can also be integrated in the same supply point, and this is particularly relevant when using water pressure. It should also be noted that the same pump 20 as the water supply can be used in connection with water pressure, if applicable. The number of water supply points 22 and the number of supply points 30 for pressurized air and/or water pressure will be adapted to desired number of zones A-D in the pipe or pipeline 10. FIG. 1B shows an example of four zones A-D, where each zone defines a part of the pipe or pipeline 10, in longitudinal direction of the same, which then can have different water flow (magnitude and/or direction) and hence different properties. The supply points 30 for pressurized air and/or water pressure are arranged so that they are located below the water level 300 in the pipe or pipeline 10, typically in lower part of the pipe or pipeline 10.

For example, the supply points 30 for pressurized air and/or water pressure can be fixed nozzles or controllable nozzles which can be controlled in some or all directions in the pipe or pipeline 10, thus creating zones A-D having desired properties (magnitude and/or direction) by forming air/water partitions having different properties.

The supply system for pressurized air and/or water pressure brings about a possibility of creating zones A-D defined by air/water partitions in longitudinal direction of the pipe or pipeline 10 by supplying pressurized air and/or water pressure having desired pressure at the supply points 30. In this way the water flow through the pipe or pipeline 10 at each of these supply points 30 can be controlled. Moreover, in this way the water flow in the pipe or pipeline 10 can be controlled, both ways in the pipe or pipeline 10, and control of the propulsion of fish in the pipe or pipeline 10 and hence achieve controlled bleeding time or cooling time for the fish, combined with transport of fish 200 from one location to another.

It should also be mentioned that the effect of the pressurized air and/or the water pressure in the supply points 30 can be amplified when needed through controllable nozzles in the water supply points 22.

Moreover, in the system, the pipe or pipeline 10 comprises overflow means 40 arranged at the open end 12 or the closed end 11, or at both locations, arranged so that water displaced by fish in the pipe or pipeline 10 can be extracted by or through a pipeline 41, for example, which is extending back to the water supply system for reuse, preferably via a controllable valve 42. The same applies by use of water pressure to control water flow, since this also will result in increased water volume in the pipe or pipeline 10.

An output device 50 is arranged at the outlet end of the pipe or pipeline 10, arranged to extract fish which has obtained sufficient retention time in the pipe or pipeline 10. This output device can be formed in numerous manners. The example illustrates an output device 50 based on a siphon principle. The output device 50 shown in the example is formed by a flexible pipe 51 which is vertically movable, up and down, in relation to the pipe or pipeline 10 by means of a lifting mechanism (now shown), e.g. a pneumatic or hydraulic cylinder, but for a person skilled in the art there will be many alternatives for elevating and lowering the flexible pipe 51 in vertical direction. Another related example, not shown, of an output device 50 will be an output device formed by a U-shaped pipe arranged to rotate about its own axis and hence open/close the outlet.

In that the output device 50 enables extraction of fish, e.g. as in the illustrated example by moving the flexible pipe 51 vertically, the fish flow out of the pipe or pipeline 10 can be controlled. Then, the fish 200 can be transported into a fish receiving unit 60 where fish and water is separated.

It will be an advantage that the diameter is reduced from the diameter of the pipe or pipeline 10 in front of the output device 50. This can for example be obtained by arranging a narrowing transition 14 between the pipe or pipeline 10 and the output device 50, e.g. as shown in FIG. 1A, where the pipe or pipeline 10 and the flexible pipe 51 exhibit different diameters and where the narrowing transition 14 connects the pipe or pipeline 10 and the flexible pipe 51. This to increase the water velocity as it leaves the pipe or pipeline 10. The same principle can advantageously be used in a pipeline 10 extending over several horizontal planes to increase the velocity of the water when one goes up to another horizontal plane. In the example this is illustrated in that the outlet 52 of the flexible pipe 51 itself exhibits smaller diameter than the flexible pipe 51 and that a narrowing transition 53 is arranged between these.

Opening and closing means 70, e.g. valves or similar, are preferably arranged at the supply device 13 and the outlet device 50 (the outlet), respectively, to enable closing both the inlet and the outlet of the pipe or pipeline 10.

After fish and water have been separated at the receiving unit 60, the fish can in a manner known per se be forwarded to other treatment stations for further treatment.

After the system is used for a certain period of time, foreign substances will accumulate in the pipe or pipeline 10. In order to remove these, the system advantageously comprises an integral washing system, e.g. in the form of lowerable nozzles 80 which can be actuated and hence wash the pipe or pipeline 10. The nozzles 80 can be connected to the same water pump 20 as the water supply, but it may also be provided a separate pump for this purpose.

Figure 2:
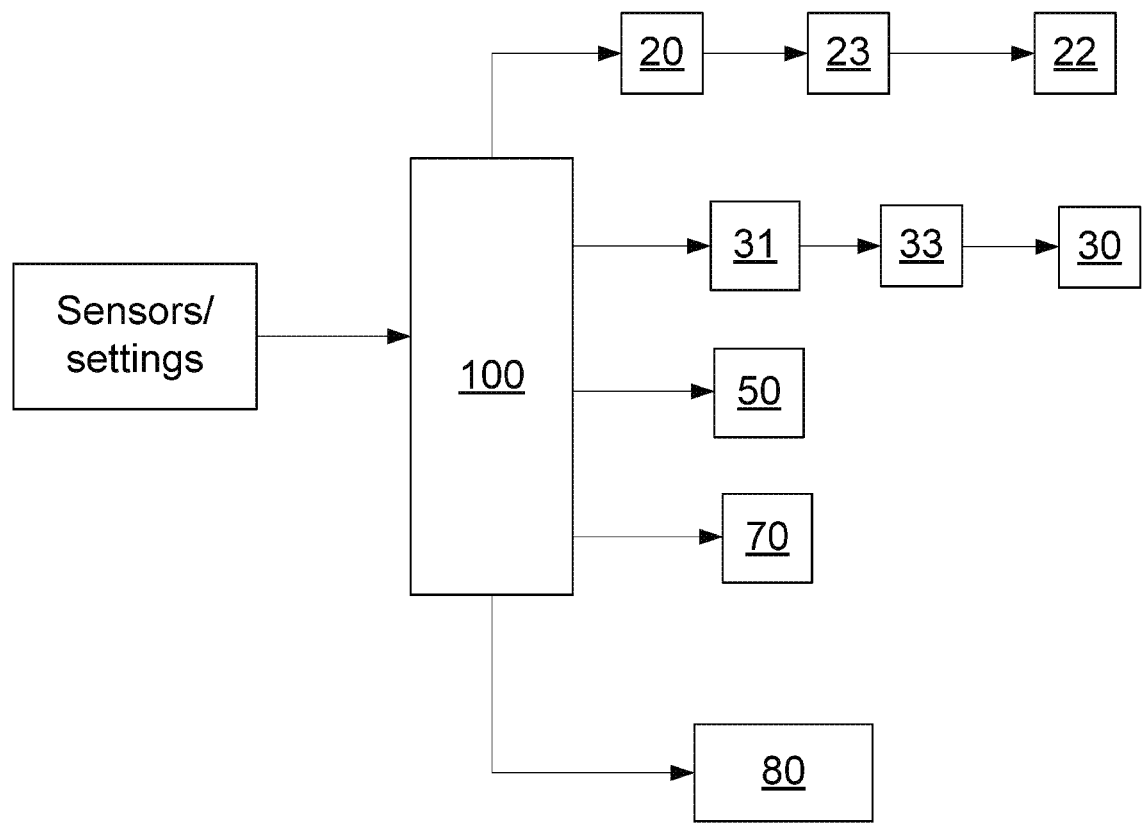
FIG. 2 illustrates a flow diagram for a system in accordance with the disclosure.

Reference is now made to FIG. 2 which shows a flow diagram for a system and method in accordance with the disclosed embodiments. Additionally, the system will further comprise at least one control unit 100 provided with means and/or software for:

controlling water supply to the water supply points 22 by controlling the pump(s) 20 and the valves 23,
controlling the supply of pressurized air and/or water pressure to the supply points 30 by controlling valves 33 and the compressor(s) or pump(s) 31, and optionally controllable nozzles forming the supply points 30,
controlling the opening and closing means 70,
controlling the output device 50,
controlling the integral washing system 80, and
optionally controlling the supply device 13.

Moreover, the present system is preferably provided with sensors (not shown) configured to detect one or more of the following:

volume or number of fish supplied to the pipe or pipeline at any time,
volume or number of fish present in the pipe/pipeline at any time,
volume or number of fish present in the different zones A-D in the pipe or pipeline,
distribution of fish in the pipe or pipeline,
water level in the pipe or pipeline,
measuring air and/or water pressure and optionally water supply or water flow.

On basis of information from the different sensors, including predefined criteria, such as desired retention time of fish 200 in the pipe or pipeline 10, volume or amount of fish allowed at the same time in the pipe or pipeline, including the amount of fish within each zone A-D, the control unit 100 will control the water flow for each zone A-D through the pipe or pipeline 10, the output device 50 and optionally the supply device 13, so that optimum retention time for the fish 200 through the pipe or pipeline 10 is obtained. Examples of sensors can be ultrasound, vision systems, flow meter, weight, etc., wherein the sensor(s) are within reach of a person skilled in the art.

The disclosed system works in the way that when the output device 50 and the supply device 13 are closed, the water supply system is activated to supply water into the pipe or pipeline 10 until a desired water level is achieved, such as e.g. 50-90% of capacity. Then, the supply device 13 is opened and killed fish 200 is supplied to the pipe or pipeline 10, preferably individually or batchwise, for transport of fish and bleeding and/or cooling before or after slaughtering. Fish which arrive in the pipe or pipeline 10 will then be transported through the pipe or pipeline 10 via propulsion provided in the different zones A-D by the air/water partitions formed by the supply points 30 where pressurized air and/or water pressure is supplied. By that the properties of the different zones A-D can be controlled and based on information from sensor means, the desired retention time can be obtained so that the retention time is as desired when the fish 200 arrives at the end of the pipe or pipeline 10.

When fish residing in the pipe or pipeline 10 has reached the desired retention time, the output device 50 can be activated and the fish extracted and transferred to the receiving unit 60.

In this way a system is obtained where full control is obtained of every single fish supplied to the pipe or pipeline 10, and when extracting one fish another one can be supplied.

The invention claimed is:

1. A method of moving fish in a pipe or pipeline, comprising the steps of:
   (a) providing a pipe or pipeline with water to a first water level via a water supply system,
   (b) supplying fish to the pipe or pipeline at a closed end of the pipe or pipeline, and
   (c) supplying pressurized air, pressurized water or both at supply points to form air or water partitions to create separate zones (A-D) having different properties with respect to direction and magnitude of water flow in the pipe or pipeline, wherein the supply points are controlled by valves, wherein the supply points are positioned at intermediate positions along a longitudinal length of the pipe or pipeline, thereby forming a controllable water flow in the zones (A-D) between the supply points for propulsion of the fish in the pipe or pipeline and controlling a retention duration of the fish in the pipe or pipeline.

2. The method of claim 1, comprising the step of extracting fish at an open end of the pipe or pipeline via an output device.

3. The method of claim 1, comprising the step of separating fish and water downstream of the output device.

4. The method of claim 2, comprising the step of separating fish and water downstream of the output device.

5. The method of claim 1, comprising supplying water at supply points in the pipe or pipeline to increase a flow intensity of the air or water partitions.

6. The method of claim 1, comprising controlling water level in the pipe or pipeline via an overflow means.

7. The method of claim 1, wherein the retention duration is determined for obtaining one or more of a first time for bleeding or cooling fish.

* * * * *